United States Patent
Whittington et al.

(10) Patent No.: US 9,755,496 B2
(45) Date of Patent: Sep. 5, 2017

(54) SOLID STATE WIDEBAND HIGH IMPEDANCE VOLTAGE CONVERTER

(71) Applicant: NATIONAL INSTRUMENTS CORPORATION, Austin, TX (US)

(72) Inventors: Mark Whittington, Austin, TX (US); Mohammadreza Samadiboroujeni, Austin, TX (US)

(73) Assignee: NATIONAL INSTRUMENTS CORPORATION, Austin, TX (US)

(*) Notice: Subject to any disclaimer, the term of this patent is extended or adjusted under 35 U.S.C. 154(b) by 912 days.

(21) Appl. No.: 14/086,047

(22) Filed: Nov. 21, 2013

(65) Prior Publication Data
US 2015/0137840 A1 May 21, 2015

(51) Int. Cl.
  G01R 31/28 (2006.01)
  H02M 1/00 (2006.01)
  G06F 1/00 (2006.01)

(52) U.S. Cl.
  CPC .............. H02M 1/00 (2013.01); G06F 1/00 (2013.01); Y02B 70/1483 (2013.01)

(58) Field of Classification Search
  USPC ........................................................ 307/151
  See application file for complete search history.

(56) References Cited

U.S. PATENT DOCUMENTS

| | | | |
|---|---|---|---|
| 5,886,512 A | 3/1999 | Becerra | |
| 6,720,828 B2 | 4/2004 | Nelson | |
| 6,889,152 B2 * | 5/2005 | More | H03M 1/1038 374/E3.009 |
| 7,557,547 B2 | 7/2009 | Inagawa | |
| 8,264,247 B2 * | 9/2012 | Prance | G01R 19/0023 324/658 |
| 8,339,810 B2 * | 12/2012 | Ratnaparkhi | H02M 5/4585 323/267 |
| 8,436,593 B2 | 5/2013 | Shao | |
| 8,653,801 B2 | 2/2014 | Shao | |
| 8,767,417 B2 | 7/2014 | Lin | |
| 8,890,494 B2 | 11/2014 | Gasperi | |
| 8,933,681 B2 | 1/2015 | Giannopoulos | |

(Continued)

*Primary Examiner* — Rexford Barnie
*Assistant Examiner* — Xuan Ly
(74) *Attorney, Agent, or Firm* — Meyertons Hood Kivlin Kowert & Goetzel, P.C.; Jeffrey C. Hood

(57) ABSTRACT

A front-end converter circuit may allow devices, e.g. oscilloscopes and digitizers, to receive input signals having a wide range of possible amplitudes while maintaining a high standardized input impedance. The converter may selectively couple, using low-voltage switches, a selected input network of two or more input networks to a virtual ground node, and a selected feedback network of two or more feedback networks to a transconductance stage input. The selected input network and selected feedback network together define a respective input signal amplitude range. The converter may also controllably adjust an AC gain of the converter to match a DC gain of the converter, and selectively couple non-selected input networks to signal ground. Output referred integrated resistor thermal noise may be reduced to a desired value by lowering the value of the transconductance stage coupled across the input of the converter (through an input resistance) and the virtual ground node.

23 Claims, 7 Drawing Sheets

(56) References Cited

U.S. PATENT DOCUMENTS

| | | | |
|---|---|---|---|
| 2002/0024363 A1* | 2/2002 | Fujimoto | G11C 27/026 327/94 |
| 2013/0249727 A1* | 9/2013 | Hurrell | H03F 3/45 341/150 |

* cited by examiner

SOLID STATE WIDEBAND HIGH IMPEDANCE VOLTAGE CONVERTER

FIELD OF THE INVENTION

The present invention relates to the field of instrumentation, and more particularly to the design of a solid-state voltage converter.

DESCRIPTION OF THE RELATED ART

In many industrial applications (and others), instruments collect data or information from an environment or unit under test (UUT), and may also analyze and process acquired data. Some instruments provide test stimuli to a UUT. Examples of instruments include oscilloscopes, digital multimeters, pressure sensors, arbitrary waveform generators, digital waveform generators, etc. The information that may be collected by respective instruments includes information describing voltage, resistance, distance, velocity, pressure, oscillation frequency, humidity, and/or temperature, among others. Computer-based instrumentation systems typically include transducers for capturing a physical phenomenon and generating a representative electrical signal, signal conditioning logic to perform amplification on the electrical signal, isolation, and/or filtering, and analog-to-digital (A/D) conversion logic for receiving analog signals and providing corresponding digital signals to the host computer system.

In a computer-based system, the instrumentation hardware or device is typically an expansion board plugged into one of the I/O slots of the computer system. In another common instrumentation system configuration, the instrumentation hardware is coupled to the computer system via other means such as through a VXI (VME extensions for Instrumentation) bus, a GPIB (General Purpose Interface Bus), a PXI (PCI extensions for Instrumentation) bus, Ethernet, a serial port or bus, or parallel port of the computer system. The instrumentation hardware may include a DAQ (Data Acquisition) board, a computer-based instrument such as a multimeter, or another type of instrumentation device. In another common system configuration, a chassis and boards inserted in the chassis may operate as a standalone instrument or instrument suite, although in some cases a host computer may be used to configure or program the boards prior to, or during operation.

The instrumentation hardware may be configured and controlled by software executing on a host computer system coupled to the system, or by a controller card installed in the chassis. The software for configuring and controlling the instrumentation system typically includes driver software and the instrumentation application software, or the application. The driver software serves to interface the instrumentation hardware to the application and is typically supplied by the manufacturer of the instrumentation hardware or by a third party software vendor. The application is typically developed by the user of the instrumentation system and is tailored to the particular function that the user intends the instrumentation system to perform. The instrumentation hardware manufacturer or third party software vendor sometimes supplies application software for applications that are common, generic, or straightforward. Instrumentation driver software provides a high-level interface to the operations of the instrumentation device. The instrumentation driver software may operate to configure the instrumentation device for communication with the host system and to initialize hardware and software to a known state. The instrumentation driver software may also maintain a soft copy of the state of the instrument and initiated operations. Further, the instrumentation driver software communicates over the bus to move the device from state to state and to respond to device requests.

The front-end circuit of an oscilloscope or a digitizer is generally associated with matching, amplification and attenuation for coupling an input signal to an electronic test and measurement circuit without loading effects on the device under test (DUT). The standard input resistance is typically 1 MΩ (Mega Ohm) with an input capacitance coupled in parallel with the input resistance and typically having a low value between 10 pF (Pico Farads) and 30 pF. This relatively high impedance allows coupling to a DUT (or circuit under test), either directly or through a compensated 10:1 oscilloscope probe, without changing the behavior of the circuit, thanks to minimal loading effects.

To accommodate a wide range of input amplitudes while maintaining a high standardized input impedance, oscilloscopes have historically used switchable compensated voltage divider circuits such as that shown in FIG. 3. In the example circuit shown in FIG. 3, input signals are provided through front panel connector 302, and are switchably routed (using switches 314 and 316, respectively) to one of two compensated voltage dividers 310 and 312, before reaching amplifier 322. Voltage dividers 310 and 312 are required to cover the full range of possible input amplitudes of the input signals. Example values for the circuit shown in FIG. 3 include R1=1 MΩ, C1=5 pF, C5=10.8 pF, R2=975 KΩ, R3=25 KΩ, C2=4.1 pF, and C3=150 pF. Accordingly, full scale for the most sensitive range might be as little as 50 mVpp, while full scale for the least sensitive range might be as much as 100 Vpp. The dynamic range of a practical amplifier and ADC (analog to digital converter) is insufficient to handle this entire voltage range with only one divider setting, requiring two or more dividers that can be individually switched into the signal path. In most cases the switching of the dividers is performed through electromechanical switching rather than solid state switching since electromechanical switches are much less susceptible to electrical damage and have higher bandwidth.

Although this arrangement is simple and has been used in oscilloscopes for many years, it reveals shortcomings when there is a need for miniaturization and robustness. The switches must be capable of operating at high voltages without sustaining damage and without introducing parasitic resistance, capacitance, and/or inductance that might compromise the frequency response. These requirements typically preclude the use of practical solid-state switches and inevitably lead to the use of one or more electromechanical relays. Relays are typically large, expensive, and eventually wear out. Another disadvantage is the need to adjust the compensated attenuators to obtain identical AC and DC gains for true "compensation". Proper compensation typically results in a flat frequency response and a step response that exhibits no exponential settling behavior. Matching the AC gain with the DC gain inevitably requires the adjustment of the capacitance ratios, since pre-adjustment capacitances tend to vary significantly from unit to unit. This capacitance ratio adjustment is normally performed through the use of manual trimmers or through laser trimming. In either case the operation is time consuming and expensive, and while varactor diodes may be used, they are subject to exhibiting nonlinearity with large signal swings, and are difficult to implement in low voltage integrated circuits.

Other corresponding issues related to the prior art will become apparent to one skilled in the art after comparing such prior art with the present invention as described herein.

SUMMARY OF THE INVENTION

Various embodiments of a front-end circuit may allow devices such as oscilloscopes and digitizers to receive input signals having a wide range of possible input amplitudes while maintaining a high standardized input impedance. A circuit, which may be an integrated input circuit, may provide the switching core for a switchable compensated voltage converter circuit that includes two or more input networks and two or more feedback networks. Each input network may represent a respective pathway that can be switchably connected (i.e. may be selectively coupled) from a front panel input of the voltage converter to a virtual ground node by way of a first set of low-voltage switches. Similarly, each feedback network may represent a respective pathway that can be switchably connected from the voltage converter output to a transconductance stage input by way of a second set of low-voltage switches. The switchably (selectively) connected (coupled) input network(s) and feedback network(s) together define a desired input signal or input voltage range for the voltage converter. The voltage converter circuit may also include a fixed pathway, which may be a resistive pathway from the input of the voltage converter to the transconductance stage input. The pathways for both the input network and the feedback network may include resistive components, capacitive components, or resistive and capacitive components.

Accordingly, an input circuit may be devised for use in a switchable voltage converter. The input circuit may include two or more input terminals, each input terminal intended to couple to a respective input network, and may further include two or more feedback terminals, each feedback terminal intended to couple to a respective feedback network. The input circuit may further include a switching network established using low-voltage switches (e.g. MOSFETs) to selectively couple a selected respective input network to a first node (configured to operate as a virtual ground node) by coupling the corresponding input terminal to the first node, and further to selectively couple a selected respective feedback network to a second node by coupling the corresponding feedback terminal to the second node. It should be noted that in some embodiments it may be preferable to selectively couple more than one input network (input pathway) to the virtual ground node at the same time, and/or selectively couple more than one feedback network (feedback pathway) to the second node at the same time. The number of pathways to selectively couple at the same time may be specified according to the desired input signal range. The selected respective input network (coupled to the first node) and the selected respective feedback network (coupled to the second node) together define an input signal value range of the voltage converter. An output of the input circuit may provide an output signal having a value within an output signal value range according to the defined input signal value range, and a control circuit within the input circuit may operate to controllably adjust an AC gain of the voltage converter to match a DC gain of the voltage converter. It should be noted that as used herein, "DC gain" may also be interpreted as low-frequency signal gain, and likewise, "AC gain" may also be interpreted as high-frequency signal gain.

In addition, the switching network may also selectively couple non-selected input networks—that is, input networks not coupled to the virtual ground node—to (an actual) signal ground, by coupling respective input terminals corresponding to the non-selected respective input networks to the signal ground. In one set of embodiments, the control circuit includes a high open-loop gain amplifier having an output coupled to the output of the input circuit, and further having an input coupled to the virtual ground node, with an adjustable capacitance circuit coupled across the input of the amplifier and the output of the amplifier. It should be noted that as referenced herein, "virtual ground node" denotes a node that is maintained at a steady reference potential, for example at a value commensurate with signal ground, without directly connecting the node to the reference potential (i.e. to signal ground). In contrast, as used herein, "signal ground" denotes the actual signal ground or more broadly the reference potential for the signal(s).

In some embodiments the adjustable capacitance circuit may be a switch-based variable capacitance feedback circuit, while in other embodiments it may be a varactor-based variable capacitance feedback circuit. The input circuit may also include a transconductance stage coupled across the virtual ground node and the second node, with the second node coupling to the input of the voltage converter via an input resistor. The transconductance value of the transconductance stage may be set to a low value to reduce an output referred integrated resistor thermal noise of the voltage converter. In addition, the transconductance stage may be constructed of an operational amplifier configured for a large non-inverting voltage gain, with an input of the operational amplifier coupled to the second node, and a high-value resistor (e.g. 1 GΩ) coupled in series with the output of the operational amplifier. The switching network may also include one or more PIN diode circuits that selectively couple a respective non-selected input network or respective non-selected input networks—which correspond to a low-voltage range or ranges, respectively—to signal ground by shunting the respective input terminal or terminals corresponding to the non-selected respective input network or the non-selected respective input networks to signal ground. In one embodiment, each input network includes a respective input pathway, and each feedback network includes a respective feedback pathway. Furthermore, the switching network includes a first set of low-voltage switches for selectively coupling the input network across the input of the voltage converter and the first node (i.e. the virtual ground node), and further includes a second set of low-voltage switches for selectively coupling the feedback network across the second node and the output of the voltage converter.

Various embodiments of a voltage converter or voltage divider circuit may include an input to receive an input voltage, and an output to provide an output voltage according to the input voltage. The voltage converter may include two or more input networks (e.g. resistive, capacitive or resistive-capacitive input networks), each input network having a respective first terminal coupled to the input of the voltage converter, and may further include two or more feedback networks, each feedback network having a respective first terminal coupled to the output of the voltage converter. A switching network within the voltage converter may include low-voltage switches operated to selectively couple a selected respective input network to a first node through a respective second terminal of the selected respective input network, and selectively couple a selected respective feedback network to a second node through a respective second terminal of the selected respective feedback network, with the selected respective input network and the selected respective feedback network together defining an input voltage range of the voltage converter. The voltage converter may also include a control circuit for controllably adjusting an AC gain of the voltage converter to match a DC gain of the voltage converter.

The switching network and the control circuit may each be operated according to digital control inputs, or digital control signals. The switching network may also be operated to selectively couple input networks not coupled to the virtual ground node to a signal ground. Furthermore, the control circuit may include a high open-loop gain amplifier with an output coupled to the output of the voltage converter, and an input coupled to the first node, thereby using the amplifier in establishing the virtual ground node, with an adjustable capacitance circuit coupled across the input of the amplifier and the output of the amplifier for adjusting a value of the capacitance across the input and output of the amplifier, which results in an adjustment of the AC gain. The low-voltage switches may be metal oxide semiconductor field effect transistors (MOSFETs), and the DC gain of the voltage converter may be collectively determined by the respective values of resistive and/or capacitive components in the selected input network and feedback network. In some embodiments, the resistors are implemented as metal film resistors.

A measurement system may include measurement devices, digitizers or other devices capable of receiving input signals having an amplitude within a wide range of possible input amplitudes while a high standardized input impedance into the measurement device (or digitizer, etc.) is maintained. The measurement system may include a device that operates on an incoming signal, and a converter circuit having an input that receives an input signal, and further having an output that provides the incoming signal to the device according to the input signal. The converter circuit may selectively couple, by a switching network of low-voltage switches such as MOSFETs, a selected respective input network or respective selected input networks of two or more input networks to a first node that operates as a virtual ground node. The converter may also selectively couple, by the switching network, a selected respective feedback network or respective selected feedback networks of two or more feedback networks, to a second node (a transconductance stage input). The selected respective input network(s) and the selected respective feedback network(s) together define an input signal value range of the input signal. The converter circuit may also controllably adjust an AC gain of the converter circuit to match a DC gain of the converter circuit, and selectively couple, by the switching network, non-selected input networks to a signal ground.

Other aspects of the present invention will become apparent with reference to the drawings and detailed description of the drawings that follow.

BRIEF DESCRIPTION OF THE DRAWINGS

A better understanding of the present invention can be obtained when the following detailed description of the preferred embodiment is considered in conjunction with the following drawings, in which.

Figure 1:
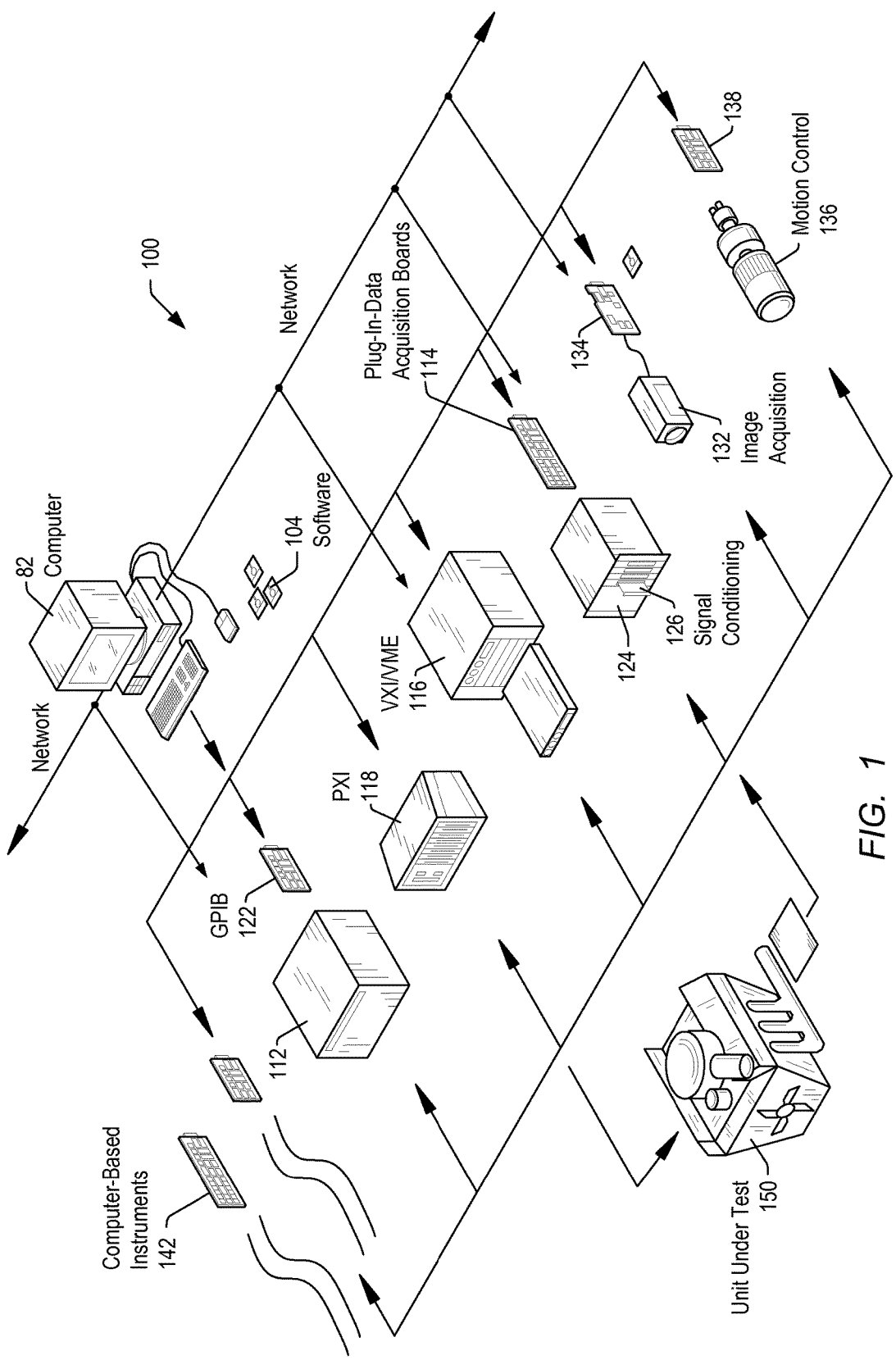
FIG. 1 shows an instrumentation control system with instruments networked together according to one embodiment of the invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Embodiments of a front-end circuit with standardized input impedance and several voltage gain settings described herein may be used in systems configured to perform test and/or measurement functions, to control and/or model instrumentation or industrial automation hardware, or to model and simulate functions, e.g., modeling or simulating a device or product being developed or tested, etc. More specifically, they may be used in various instances where a front-end circuit for instrumentation/measurement equipment is required, without degrading the performance and accuracy of the measurements. However, it is noted that various embodiments may equally be used for a variety of applications, and such applications are not intended to be limited to those enumerated above. In other words, applications discussed in the present description are exemplary only, and various embodiments of front-end circuits including an adjustable attenuator may be used in any of various types of systems.

FIG. 1 illustrates an exemplary instrumentation control system 100 which may be configured according to embodiments of the present invention. System 100 comprises a host computer 82 which may couple to one or more instruments configured to perform a variety of functions using timing control implemented according to various embodiments of the present invention. Host computer 82 may comprise a CPU, a display screen, memory, and one or more input devices such as a mouse or keyboard as shown. Computer 82 may operate with one or more instruments to analyze, measure, or control a unit under test (UUT) or process 150. The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices.

The computer system may couple to and operate with one or more of these instruments. In some embodiments, the computer system may be coupled to one or more of these instruments via a network connection, such as an Ethernet connection, for example, which may facilitate running a high-level synchronization protocol between the computer system and the coupled instruments. The instruments may be coupled to the unit under test (UUT) or process 150, or may be coupled to receive field signals, typically generated by transducers. System 100 may be used in a data acquisition and control applications, in a test and measurement application, an image processing or machine vision application, a process control application, a man-machine interface application, a simulation application, or a hardware-in-the-loop validation application, among others.

Figure 2:
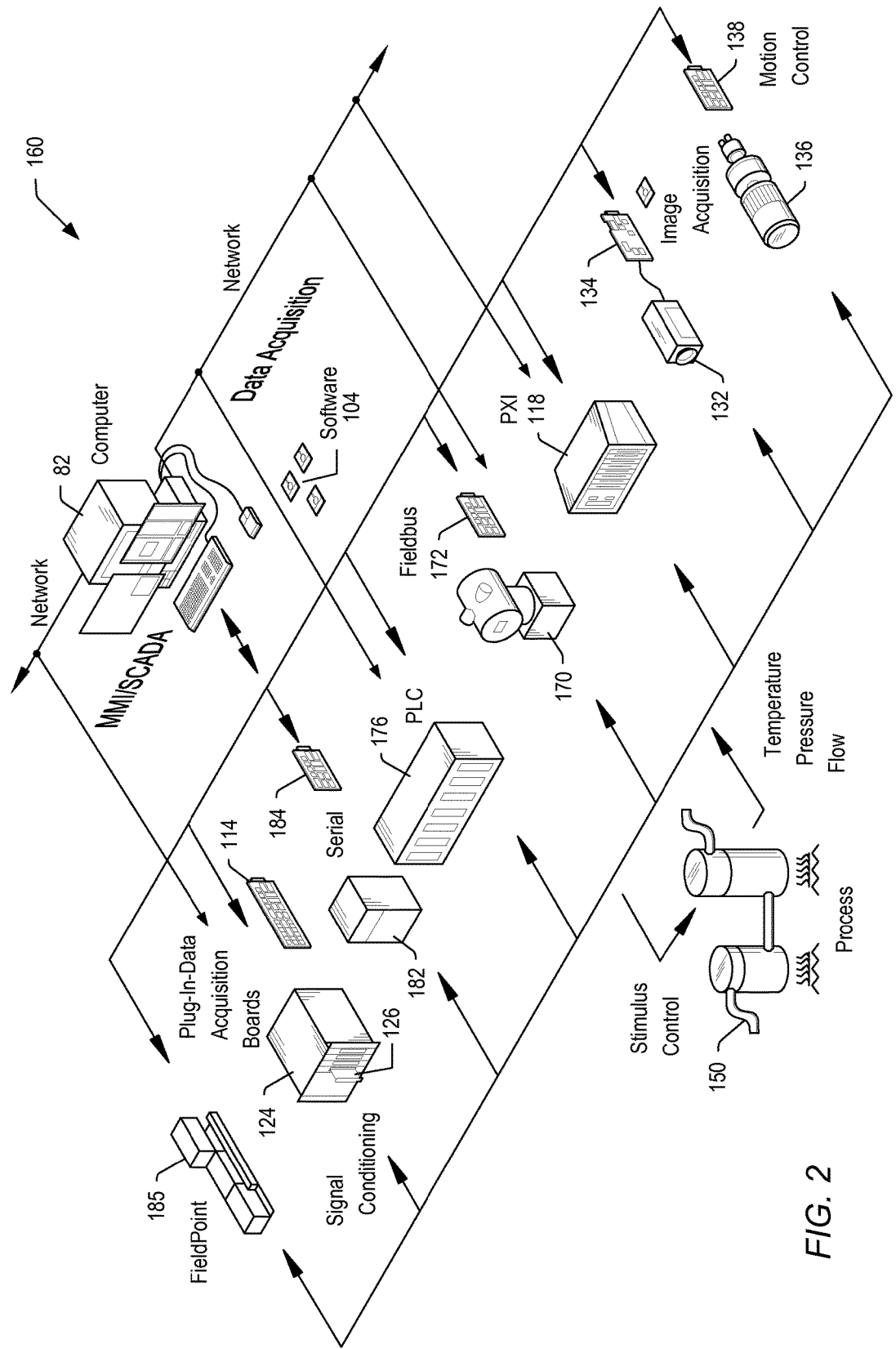
FIG. 2 shows an industrial automation system with instruments networked together according to one embodiment of the invention.

FIG. 2 illustrates an exemplary industrial automation system 160 that may be configured according to embodiments of the present invention. Industrial automation system 160 may be similar to instrumentation or test and measurement system 100 shown in FIG. 2. Elements that are similar or identical to elements in FIG. 1 have the same reference numerals for convenience. System 160 may comprise a computer 82 which may couple to one or more devices and/or instruments configured to perform a variety of functions using timing control implemented according to various embodiments of the present invention. Computer 82 may comprise a CPU, a display screen, memory, and one or more input devices such as a mouse or keyboard as shown. Computer 82 may operate with the one or more devices and/or instruments to perform an automation function, such as MMI (Man Machine Interface), SCADA (Supervisory Control and Data Acquisition), portable or distributed data acquisition, process control, and advanced analysis, among others, on process or device 150.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a field bus device 170 and associated field bus interface card 172, a PLC (Programmable Logic Controller) 176, a serial instrument 182 and associated serial interface card 184, or a distributed data acquisition system, such as the Compact FieldPoint or CompactRIO systems available from National Instruments, among other types of devices. In some embodiments, similar to the system shown in FIG. 1, the computer system may couple to one or more of the instruments/devices via a network connection, such as an Ethernet connection.

Figure 4:
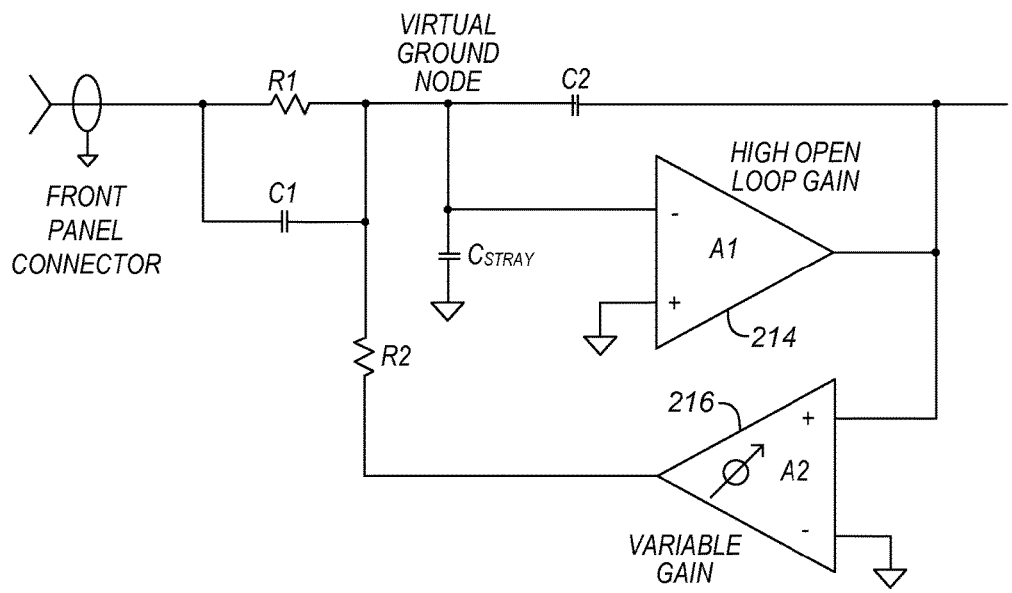
FIG. 4 shows the circuit diagram of a front-end circuit implemented in a low-voltage integrated circuit, according to prior art.

FIG. 4 illustrates one embodiment of a prior art input circuit that overcomes some of the limitations associated with commonly used input circuits aimed at facilitating a wide range of input amplitudes. In the embodiment shown in FIG. 4, amplifier 214 has a high open-loop gain, and feedback is provided from the output back to the inverting input through capacitor C2. Therefore, the impedance on the inverting input node of amplifier 214 with respect to ground is low, and the node is thereby often referred to as a "virtual ground". Capacitor C1 connects the front panel input to this virtual ground node. Thus, the voltage gain of the high frequency closed loop response is nominally −C1/C2. The DC gain of the circuit may be expressed as −R2/(A$_{v2}$*R1), where A$_{v2}$ is the gain of amplifier 216. As was the case with the compensated voltage divider, this circuit is also to be compensated, which may be accomplished electronically by adjusting A$_{v2}$ to obtain a closed loop DC gain that matches the closed loop AC gain. That is, Av$_2$ may be adjusted to obtain the condition R2/(A$_{v2}$*R$_1$)=C$_1$/C$_2$. Compensation by this method obviates the need for hand trimming or laser trimming, providing a notable advantage over other prior art circuits.

In addition, in the circuit of FIG. 4, any capacitance C$_{STRAY}$ connected between virtual ground and actual ground has little effect on the response. Multiple switches may be used to connect multiple attenuation networks to the virtual ground node, and those switches may have a high C$_{STRAY}$ characteristic and still not adversely affect circuit operation. Because signal voltage is low at the virtual ground node, switches of a low-voltage type may be added into the circuit. For example, the switches could be MOSFETs (metal oxide semiconductor field effect transistors) in a CMOS (complementary metal oxide semiconductor) integrated circuit.

Figure 5:
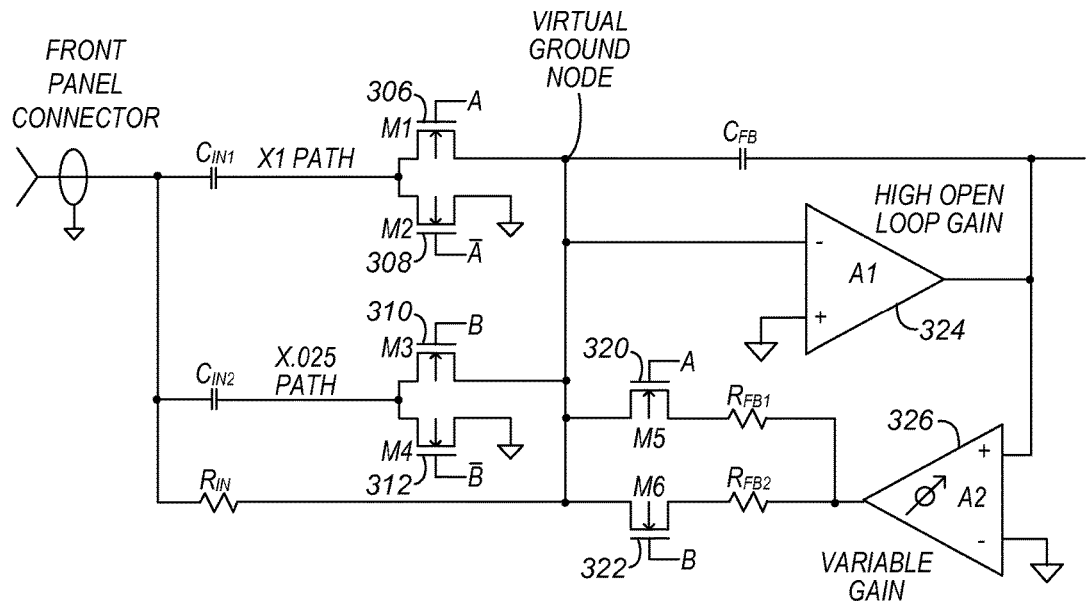
FIG. 5 shows the circuit diagram of one embodiment of a front-end circuit implemented in an integrated circuit and featuring low-voltage switching.

FIG. 5 shows a circuit diagram of one possible implementation of a front-end circuit based on the circuit shown in FIG. 4, also including low-voltage type switches to couple one of at least two different input paths or input networks to the virtual ground node at a time. In addition to switches 306 and 320, and 310 and 322 respectively connecting a selected input network to virtual ground, there are also switches 308 and 312 respectively connecting the unused (i.e. not selected) input network to actual ground. That is, when an input network is not selected, it is connected to actual ground (or to an actual voltage reference), in addition to not being connected to the virtual ground node. This results in the input impedance being the same for all range settings while also preventing high voltage from appearing across any of the switching devices, whether the switching devices are on or off. As shown in FIG. 5, the switching devices are implemented as MOSFETs M1, M2, M3, M4, M5 and M6. While the circuit implementation shown in FIG. 5 provides many advantages, it may also suffer from certain disadvantages.

One of the disadvantages may be elevated low-frequency noise. Resistor thermal noise creates a substantial low-frequency noise component in the circuit shown in FIG. 5, even when the front panel input is shorted. For the circuit in FIG. 5, the output referred resistor thermal noise response is characterized by one real pole with cutoff frequency, as indicated by:

$$\omega_C = \frac{1}{R_{FB} C_{FB}}. \quad (1)$$

The output referred noise density close to DC may expressed as:

$$e_n^2 = 4kT \left( R_{FB} + \frac{R_{FB}^2}{R_{IN}} \right), \quad (2)$$

where k is Boltzmann's constant, and T is temperature in degrees Kelvin. Using equations (1) and (2), the output referred integrated resistor thermal noise ($E_n^2$) may be obtained. Based on equation (2):

$$E_n^2 = e_n^2 \int_0^\infty \left( \frac{\omega_c^2}{\omega^2 + \omega_c^2} \right) d\omega = 4kT\left(R_{FB} + \frac{R_{FB}^2}{R_{IN}}\right)\frac{\pi}{2}\omega_C. \quad (3)$$

Substituting equation (2) for $\omega_c$, the thermal noise may be expressed as:

$$E_n^2 = \frac{2\pi kT}{C_{FB}}\left(1 + \frac{R_{FB}}{R_{IN}}\right). \quad (4)$$

This noise may not be easily or readily reducible, since component values in the final equation above are set according to other considerations such as input impedance, bandwidth and dynamic range.

A second disadvantage in the circuit of FIG. 5 may be gain variability. The overall gain is set by the capacitance ratio $C_{IN}/C_{FB}$, even at DC, since the DC gain is adjusted to match the AC gain, and the overall gain may vary significantly from unit to unit since capacitance variability is relatively high when very small value capacitances are used, as in the case of the circuit shown in FIG. 5. A third disadvantage in the circuit of FIG. 5 is the possibility of high transient current at the input. When a high-voltage range is selected and a high-voltage transient occurs at the input, a high transient current flows through the capacitors in the deselected path (i.e. through the path that has not been selected through the switching). This is especially true of the lowest voltage path, which—in the circuit of FIG. 5—includes $C_{IN1}$, as that capacitance is the largest, and the far-end is nominally shunted to ground through a switch (in the circuit of FIG. 5, MOSFET 308). Such a high current could unintentionally turn on the associated forward path switch (MOSFET 306 in the circuit of FIG. 5) and cause a large measurement error or even present a reliability issue.

Finally, a fourth potential disadvantage with the configuration of the circuit in FIG. 5 may be amplifier complexity. Preferably, the gain and offset characteristic of variable gain feedback amplifier 326 would be unaffected by temperature. Amplifier 326 would also preferably have a bandwidth of at least several MHz if aberrations in the compensated frequency response were to be avoided. It would also be preferable to maintain high linearity, as well as good second order distortion performance at high frequencies. Otherwise, DC offsets may be induced by high-amplitude high-frequency signal content.

Figure 6:
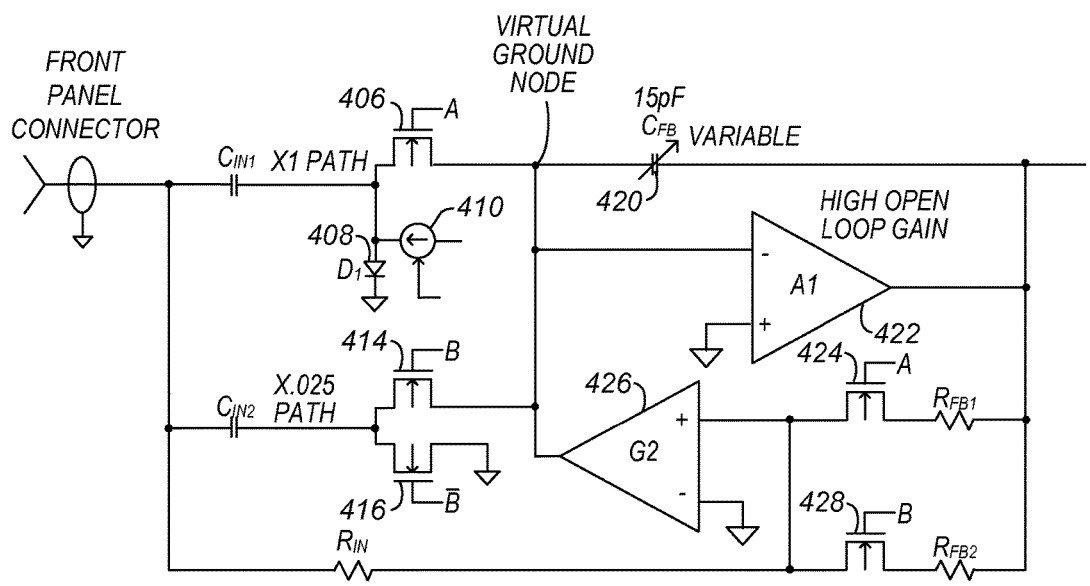
FIG. 6 shows the circuit diagram of one embodiment of an improved front-end circuit implemented in an integrated circuit and featuring low-voltage switching.

FIG. 6 shows the circuit diagram of one embodiment of an improved front-end (or input) circuit that has reduced low-frequency noise, less unit-gain variability, and improved high amplitude transient handling capability without the use of a complicated variable gain amplifier such as amplifier 326 of FIG. 5. The circuit of FIG. 6 may be implemented in a low-voltage integrated circuit (IC), and may be used with a measuring instrument or device, for example an oscilloscope or a digitizer, or a variety of other devices that may benefit from support for a wide dynamic range of input signals. In other words, the front-end circuit may be used to provide the input signals to measuring instruments/equipment, such as an oscilloscope or digitizer that may be configured in a system such as the one shown in FIG. 1 and/or FIG. 2.

Reduced Low-Frequency Noise:

In the circuit of FIG. 6, a transconductance stage 426 is inserted between the virtual ground node (at the input of amplifier 422) and the common node for resistive inputs $R_{IN}$ and $R_{FB1}$ & $R_{FB2}$. More specifically, a first terminal (output terminal of transconductance stage 426) is coupled to the virtual ground node, and a second terminal (non-inverting input of transconductance stage 426) is coupled to the common node for the resistive inputs. (As described herein, the transconductance stage 426 may also be considered as being inserted or coupled across the virtual ground node and the common node, as referenced above). With this modification, the output referred noise density close to DC remains unchanged from what it is in the circuit of FIG. 5. Accordingly, equation (1) is equally valid for the circuit shown in FIG. 6. The cutoff frequency, however, may be modified by changing the transconductance of transconductance stage 426. The new cutoff frequency may then be expressed as:

$$\omega_C = \frac{G_2 R_{FB}}{(R_{FB} + R_{IN})C_{FB}}, \quad (5)$$

where $G_2$ represents the transconductance (value) of transconductance stage 426, and $R_{FB}$ represents the resistance value of the selected feedback resistor (either $R_{FB1}$ or $R_{FB2}$). The output referred integrated resistor thermal noise may then be expressed as:

$$E_n^2 = \frac{2\pi kT}{C_{FB}} R_{FB} G_2. \quad (6)$$

Figure 3:
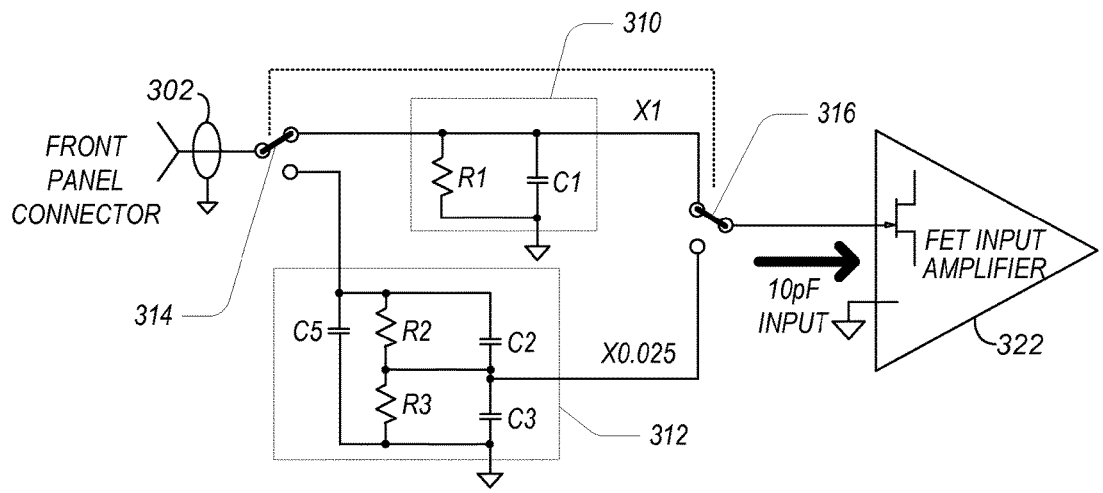
FIG. 3 shows the circuit diagram of a front-end circuit containing a switchable compensated voltage divider circuit, according to prior art.
Figure 7:
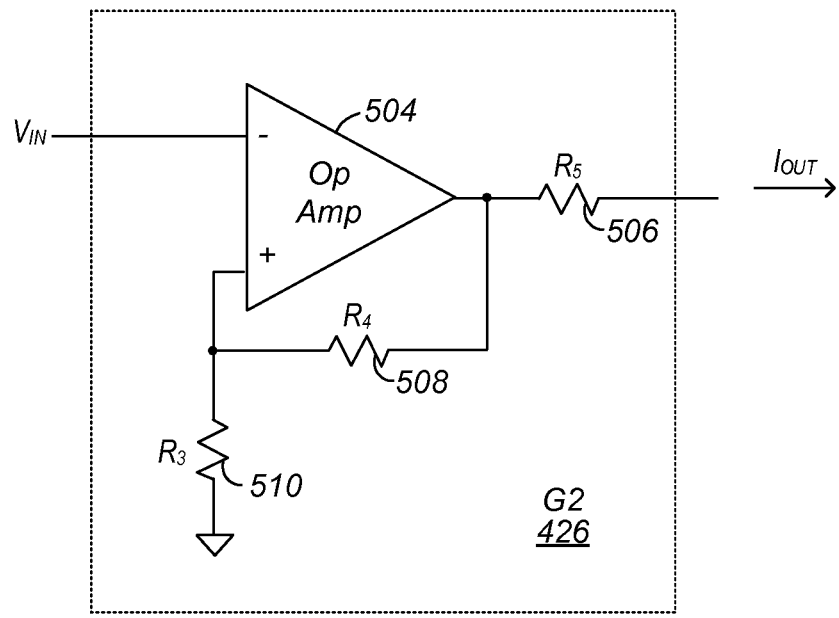
FIG. 7 shows the circuit diagram of one embodiment of a low transconductance stage implemented using an operational amplifier stage with non-inverting gain.

As seen in equation (6), the value of $En^2$ may be reduced to any value by lowering the value of $G_2$. One way to lower the value of $G_2$ is by implementing transconductance stage 426 such that it contributes little additional thermal noise to the system beyond the thermal noise already created by $R_{IN}$ and $R_{FB1}$ & $R_{FB2}$. FIG. 7 shows one embodiment of transconductance stage 426 that may be used in the circuit of FIG. 6. In the embodiment shown in FIG. 7, transconductance stage 426 is implemented using a very large valued resistor 506 ($R_5$=1 GΩ, for example), and an op amp stage (operational amplifier stage) with op amp 504 configured for a large non-inverting voltage gain with resistors $R_4$ 508 and $R_5$ 510. The non-inverting gain is set relatively high in this example ($R_3$=1 KΩ; $R_4$=99 KΩ; =>Av=(1+$R_4$/$R_3$)=100) so that the thermal noise contribution of $R_5$ is small compared to $R_{IN}\|R_{FB}$, where $R_{IN}\|R_{FB}$ represents the equivalent value of $R_{IN}$ in parallel with $R_{FB}$). Given the values shown for the X1 path in FIG. 6, the output thermal noise of $R_5$ compared to $R_{IN}\|R_{FB}$ is 10*log($R_5/(Av^2(R_{IN}\|R_{FB}))$)=−7 dB. Accordingly, the embodiment of transconductance 426 shown in FIG. 7 adds little additional thermal noise. It should be noted that the noise contributions of $R_3$ and $R_4$ were not included in the above analysis as their noise contributions are well below the noise contributed by a 1 MΩ resistor (typically, the value of RIN in FIG. 7. Is 1 MΩ). The noise contribution of the op amp may also be neglected, since there are widely available FET input op amps with noise levels well below that of a 1 MΩ resistor. Even with $A_v$ set to 100, the overall transconductance $G_2$=$A_v$/$R_5$=0.1 uS is still low and results in lowering $En^2$ in equation (6). When compared to $En^2$ of the circuit of FIG. 5, the noise reduction for the X1 path in the circuit of FIG. 6 is a substantial 13 dB:

$$10\log\left[\frac{E^2_{n_{Fig4}}}{E^2_{n_{Fig3}}}\right] = \quad (7)$$

$$10\log\left[\frac{R_{FB}G_2}{1+R_{FB}/R_{IN}}\right] = 10\log\left[\frac{1M\Omega \cdot 0.1\mu S}{1+1M\Omega/1M\Omega}\right] = -13 \text{ dB}$$

It should be noted that the actual values above are provided only as examples for a specific embodiment and to illustrate the value ranges of the various components with respect to each other. Other embodiments may include different values similarly related to each other, as desired.

Reduced Gain Variability:

The circuit of FIG. 6 may be compensated by adjusting the AC gain to match the DC gain by adjusting the value of $C_{FB}$ 420. Since the DC gain in the circuit may be made accurate by using inexpensive 0.1% metal film resistors for $R_{IN}$ and $R_{FB}$, the AC gain remains just as accurate after compensation. This is the opposite of the case of the circuit in FIG. 5, where the DC gain was adjusted to match the much less accurate AC gain. Two embodiments of variable feedback capacitor networks that may be used to implement $C_{FB}$ 420 are shown in FIG. 8 and FIG. 9.

Figure 8:
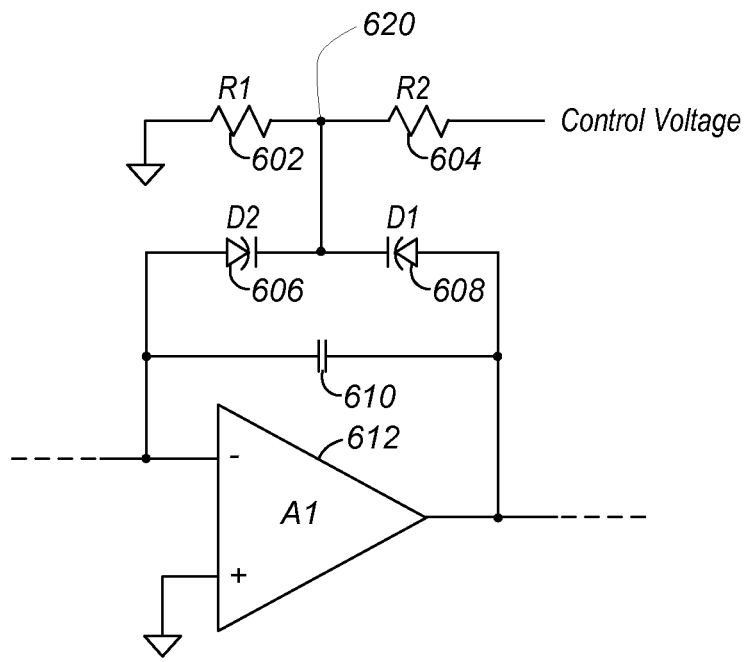
FIG. 8 shows the circuit diagram of one embodiment of a varactor-based variable capacitance feedback circuit.

FIG. 8 shows an embodiment of a varactor-based variable capacitance feedback circuit. In the circuit of FIG. 8, an opposing series pair of variable capacitance diodes 606 and 608 is used with an amplifier 612, feedback capacitance 610, and voltage-divider resistors 602 and 604. The arrangement shown in FIG. 8 cancels even order distortion caused by the diode capacitance changing with the signal voltage. DC control voltage is applied to the diodes through the resistive voltage divider that includes resistors 602 and 604. The Thevenin equivalent AC voltage at the resistive divider tap node 620 matches the Thevenin equivalent AC voltage at the capacitive (diode) divider tap, and as a result the resistive network does not load the capacitive network, preventing distortion and exponential settling tails.

Figure 9:
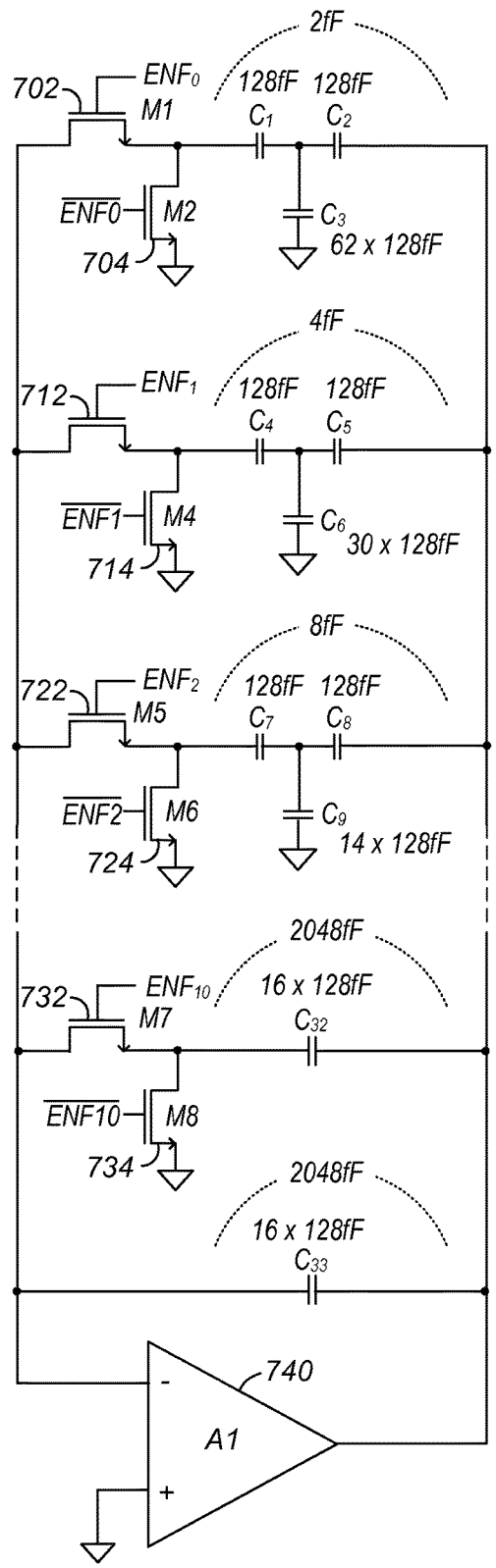
FIG. 9 shows the circuit diagram of one embodiment of a switch-based variable capacitance feedback circuit.

FIG. 9 shows one embodiment of a switch-based variable capacitance feedback circuit. The embodiment shown in FIG. 9 features 11 bits and an LSB (least significant bit) weighting of 2 fF, which allows for adjusting the capacitance from 2.048 fF to 6.142 pF in 2 fF steps, according to the indicated capacitance values. The values for all the capacitances in FIG. 9 are provided by way of example, and other embodiments may feature different values as desired. As shown in FIG. 9, capacitors are switched in and out of the feedback path of amplifier 740 using MOSFETs 702/704, 712/714, 722/724, to MOSFETs 732/734. The capacitor values are binary weighted. Accordingly, if the LSB capacitance value is $C_0$ and there are N switches, any feedback capacitance value between 0 and $(2^N-1)*C_0$ may be obtained within ½ LSB by closing the appropriate switches. It should be noted that the LSB transfer capacitance might have too small a value to be implemented with a single capacitor, and a voltage divider arrangement may be used to obtain the desired LSB transfer capacitance value. In FIG. 9, the arrangement of $C_1$, $C_2$, and $C_3$ creates an effective transfer capacitance of 2 fF even though the smallest value used is 128 fF.

Improved High Input Transient Current Handling:

Rather than using a MOSFET to shunt the disconnected low-voltage range capacitor $C_{IN1}$ as was shown in the circuit of FIG. 5, the improved circuit in FIG. 6 may feature a PIN diode with high current handling capability. As seen in FIG. 6, the $C_{IN1}$ path (i.e. X1 path) is shunted to actual ground (more generally an actual voltage reference) through PIN diode ($D_1$) 408 when DC current source ($I_1$) 410 is energized. A PIN diode such as diode 408 may be favored over a MOSFET because of the very high transient current that might flow through $C_{IN1}$ in response to a high input voltage transient. Such a large transient may inadvertently turn on MOSFET 306 shown in FIG. 5, while such is not the case for MOSFET 406 in FIG. 6 with the presence of PIN diode shunt circuit that includes diode 408 and current source 410. It should also be noted that a high voltage step might be within the normal range of the X0.025 pathway. In one set of embodiments, PIN diode 408 is selected to be a low ON resistance and low inductance type diode. While a MOSFET scaled to have the same resistance as diode 408 might be considered a possible replacement for diode 408, such a MOSFET may have too much capacitance, and may therefore not be as effective as diode 408 in most preferred embodiments.

Lower Amplifier Complexity:

Because the circuit shown in FIG. 6 includes no variable gain amplifier, the complexity associate with a variable gain amplifier (included in the circuit of FIG. 5) is avoided.

Figure 10:
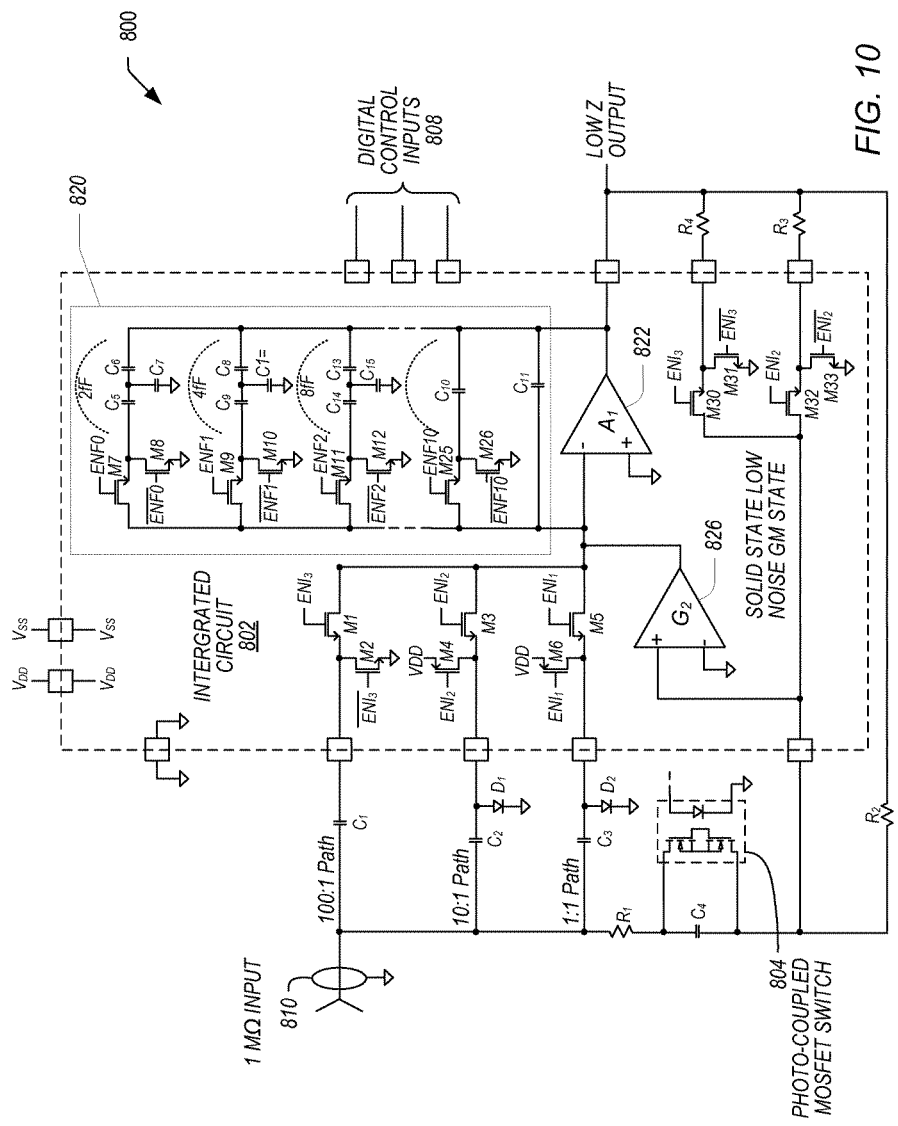
FIG. 10 shows the circuit diagram of one embodiment of a solid-state wideband high-impedance voltage converter implemented in a custom integrated circuit.

Integrated Circuit (IC) Implementation:

FIG. 10 shows one possible embodiment of the circuit shown in FIG. 6. More specifically, FIG. 10 shows the circuit diagram of a solid-state wideband high-impedance voltage converter 800 built around a custom integrated circuit 802. As seen in FIG. 10, very few external components are required, and there is no need for an electromechanical relay. In the embodiment shown in FIG. 10, three gain settings are possible depending on which input path is selected: 1/100 if $C_1$ (input capacitor $C_1$) is selected, 1/10 if $C_2$ (input capacitor $C_2$) is selected, or unity if $C_3$ (input capacitor $C_3$) is selected. PIN diodes $D_1$ and $D_2$ may be external to the IC 802 and may be turned on to provide the shunting action for the 1:1 and 10:1 paths, which, in this embodiment, are considered to be defining low-voltage ranges, when they are deselected. The current sources enabled to turn on these switches are provided by transistor devices M4 and M6 located inside IC 802. Variable feedback capacitance for amplifier 822 is provided by a binary weighted switched capacitor array 820 (similar to the array shown in FIG. 9) coupled across the inverting input and the output of amplifier 822. Switching within switched capacitor array is provided by transistor devices M7 through M26. Amplifier 822 may be optimized for very high speed.

As also seen in FIG. 10, an AC/DC coupling option is provided by photo-coupled MOSFET switch 804 (which can be a small and inexpensive switch that is also in widespread use in high volume telephony applications) in series with input resistor R1, which has a value of 1 MΩ in the embodiment shown. With three gain settings for the capacitive input paths (or input networks), there may also be three corresponding DC feedback paths (or feedback networks), which are provided by $R_2$, $R_3$, and $R_4$, and are switched inside IC 802 using transistor devices M30 through M33. As seen in the case of each input network (i.e. the 100:1 path, 10:1 path, and 1:1 path), the input network has a first terminal coupled to input 810, and a second terminal that can be selectively coupled via the corresponding pin/terminal of IC 802 to the virtual ground node at the inverting input of amplifier 822. Similarly, in the case of each feedback network (i.e. the path including $R_3$ and the path including $R_4$, respectively), the feedback network has a first terminal coupled to the output of the converter 800, and a second terminal that can be selectively coupled via the corresponding pin/terminal of IC 802 to the second node, that is, to the non-inverting input of transconductance stage 826. The low-noise low transconductance stage 826 may be implemented as previously described with respect to FIG. 7.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An input circuit for establishing a switchable voltage converter, the input circuit comprising:
    two or more input terminals, each input terminal of the two or more input terminals configured to couple to a respective input network, each input network comprising a respective input pathway;
    two or more feedback terminals, each feedback terminal of the two or more feedback terminals configured to couple to a respective feedback network, each feedback network comprising a respective feedback pathway;
    a switching network comprising:
        a first set of low-voltage switches configured to selectively couple the respective input pathway of a selected respective input network across an input of the voltage converter and a first node; and
        a second set of low-voltage switches configured to selectively couple the respective feedback pathway of a selected respective feedback network across a second node and an output of the voltage converter, wherein the selected respective input network and the selected respective feedback network together define an input signal value range of the voltage converter;
    an output configured to provide an output signal having a value within an output signal value range according to the defined input signal value range; and
    a control circuit configured to controllably adjust an AC gain of the voltage converter to match a DC gain of the voltage converter.

2. The input circuit of claim 1, wherein the switching network is configured to selectively couple non-selected respective input networks to signal ground by coupling respective input terminals corresponding to the non-selected respective input networks to the signal ground.

3. The input circuit of claim 1, wherein the control circuit comprises:
    a high open-loop gain amplifier having an output coupled to the output of the input circuit, and further having an input coupled to the first node; and
    an adjustable capacitance circuit coupled across the input of the amplifier and the output of the amplifier.

4. The input circuit of claim 3, wherein the adjustable capacitance circuit comprises one of:
    a switch-based variable capacitance feedback circuit;
    a varactor-based variable capacitance feedback circuit.

5. The input circuit of claim 1, further comprising:
    a transconductance stage coupled across the first node and the second node.

6. The input circuit of claim 5, wherein the transconductance stage comprises:
    an operational amplifier configured for a large non-inverting voltage gain, with an input of the operational amplifier coupled to the second node; and
    a high-value resistor coupled in series with an output of the operational amplifier.

7. The input circuit of claim 5, wherein the transconductance stage has a transconductance adjusted to reduce an output referred integrated resistor thermal noise of the voltage converter.

8. The input circuit of claim 1, wherein the switching network comprises a PIN diode circuit configured to selectively couple a non-selected respective input network to signal ground by coupling a respective input terminal corresponding to the non-selected respective input network to the signal ground;
    wherein the non-selected respective input network corresponds to a low-voltage range.

9. A voltage converter comprising:
    an input configured to receive an input voltage;
    an output configured to provide an output voltage according to the input voltage;
    two or more input networks, each input network of the two or more input networks comprising a respective first terminal coupled to the input and further comprising a respective input pathway;
    two or more feedback networks, each feedback network of the two or more feedback networks comprising a respective first terminal coupled to the output and further comprising a respective feedback pathway;
    a switching network comprising:
        a first set of low-voltage switches configured to selectively couple the respective input pathway of a selected respective input network across the input and a first node through a respective second terminal of the selected respective input network; and
        a second set of low-voltage switches configured to selectively couple the respective feedback pathway of a selected respective feedback network across a second node and the output through a respective second terminal of the selected respective feedback network, wherein the selected respective input network and the selected respective feedback network together define an input voltage range of the voltage converter; and
    a control circuit configured to controllably adjust an AC gain of the voltage converter to match a DC gain of the voltage converter.

10. The voltage converter of claim 9, wherein the switching network is configured to selectively couple respective input networks not coupled to the first node to a signal reference.

11. The voltage converter of claim 9, wherein the control circuit comprises:
    a high open-loop gain amplifier having an output coupled to the output of the voltage converter, and further having an input coupled to the first node; and
    an adjustable capacitance circuit coupled across the input of the amplifier and the output of the amplifier.

12. The voltage converter of claim 11, wherein the adjustable capacitance circuit comprises one of:
    a switch-based variable capacitance feedback circuit;
    a varactor-based variable capacitance feedback circuit.

13. The voltage converter of claim 9, further comprising:
    a transconductance stage coupled across the first node and the second node.

14. The voltage converter of claim 13, wherein the transconductance stage comprises:
    an operational amplifier configured for a large non-inverting voltage gain, with an input of the operational amplifier coupled to second node; and
    a high-value resistor coupled in series with an output of the operational amplifier.

15. The voltage converter of claim 9, wherein the switching network comprises a PIN diode circuit configured to selectively couple a respective input network not coupled to the first node to a signal ground;
wherein the respective input network not coupled to the virtual ground corresponds to a low-voltage range.

16. The voltage converter of claim 9, wherein the low-voltage switches comprise metal-oxide semiconductor field-effect transistors (MOSFETs).

17. The voltage converter of claim 9, wherein the two or more input networks and the two or more feedback networks comprise one or more of:
one or more resistive components; or
one or more capacitive components;
wherein a DC gain of the voltage converter is collectively determined by:
respective values of resistive components of the one or more resistive components comprised in the two or more input networks and in the two or more feedback networks; and
capacitive components of the one or more capacitive components comprised in the two or more input networks and in the two or more feedback networks.

18. The voltage converter of claim 17, wherein the one or more resistor components comprise metal film resistors.

19. A measurement system comprising:
a device configured to operate on an incoming signal; and
a converter circuit having an input configured to receive an input signal, and having an output configured to provide the incoming signal according to the input signal, wherein the converter circuit is configured to:
selectively couple, by a first set of low-voltage switches, a respective input pathway of a selected respective input network of two or more input networks across the input and a first node configured to operate as a virtual ground node; and
selectively couple, by a second set of low-voltage switches, a respective feedback pathway of a selected respective feedback network of two or more feedback networks, across a second node and the output, wherein the selected respective input network and the selected respective feedback network together define an input signal value range of the input signal; and
controllably adjust an AC gain of the converter circuit to match a DC gain of the converter circuit.

20. The measurement system of claim 19, wherein the converter circuit is further configured to selectively couple, by the switching network, non-selected respective input networks to an actual signal ground.

21. The measurement system of claim 19, wherein the converter circuit comprises a control circuit configured to controllably adjust the AC gain of the converter circuit, wherein the control circuit comprises:
a high open-loop gain amplifier having an output coupled to the output of the converter circuit, and further having an input coupled to the first node; and
an adjustable capacitance circuit coupled across the input of the amplifier and the output of the amplifier.

22. The measurement system of claim 19, wherein the converter circuit comprises:
a transconductance stage coupled across the first node and the second node, and having a transconductance adjusted to reduce an output referred integrated resistor thermal noise of the converter circuit.

23. The measurement system of claim 19, further comprising an input resistor coupled across the second node and the input of the converter circuit.

* * * * *